(12) United States Patent
de Waal

(10) Patent No.: US 6,698,824 B2
(45) Date of Patent: Mar. 2, 2004

(54) ROOF SYSTEM FOR A MOTOR VEHICLE

(75) Inventor: Martin Frank de Waal, Wormerveer (NL)

(73) Assignee: Webasto Product International B.V., Haarlem (NL)

( * ) Notice: Subject to any disclaimer, the term of this patent is extended or adjusted under 35 U.S.C. 154(b) by 0 days.

(21) Appl. No.: 10/295,046

(22) Filed: Nov. 15, 2002

(65) Prior Publication Data

US 2003/0111870 A1 Jun. 19, 2003

(30) Foreign Application Priority Data

Nov. 16, 2001 (DE) .......................................... 101 56 102

(51) Int. Cl.[7] ................................................ B60J 7/043
(52) U.S. Cl. ................................... 296/211; 296/216.03
(58) Field of Search ................................ 296/211, 215, 296/216.01, 216.03; D12/401

(56) References Cited

U.S. PATENT DOCUMENTS

| | | | | |
|---|---|---|---|---|
| 4,744,430 A | * | 5/1988 | McCoy | 180/2.2 |
| 4,911,496 A | | 3/1990 | Fuerst | |
| 5,203,601 A | * | 4/1993 | Guillot | 296/77.1 |
| 5,843,548 A | * | 12/1998 | Sanders | 428/40.1 |
| 6,220,657 B1 | * | 4/2001 | Rea | 296/220.01 |

FOREIGN PATENT DOCUMENTS

| | | |
|---|---|---|
| DE | 38 01 881 A1 | 8/1988 |
| DE | 38 02 380 A1 | 8/1988 |
| DE | 41 29 850 C1 | 11/1992 |
| DE | 0 531 881 A2 | 3/1993 |

* cited by examiner

*Primary Examiner*—Dennis H. Pedder
(74) *Attorney, Agent, or Firm*—Nixon Peabody LLP; David S. Safran

(57) ABSTRACT

A roof system for a motor vehicle with at least two covers (2, 3) which are located in a fixed motor vehicle roof (1) with an intermediate section (1B) of the fixed motor vehicle roof (1) located between the covers (2, 3). To produce an economical roof system which can be matched to any vehicle roof size and shape, and which is suitable for retrofit installation, a covering is provided on the intermediate section (1B) between the covers (2, 3) which is formed preferably as a film and which has an outer surface with a visual appearance that is matched in that of the covers (2, 3).

14 Claims, 2 Drawing Sheets

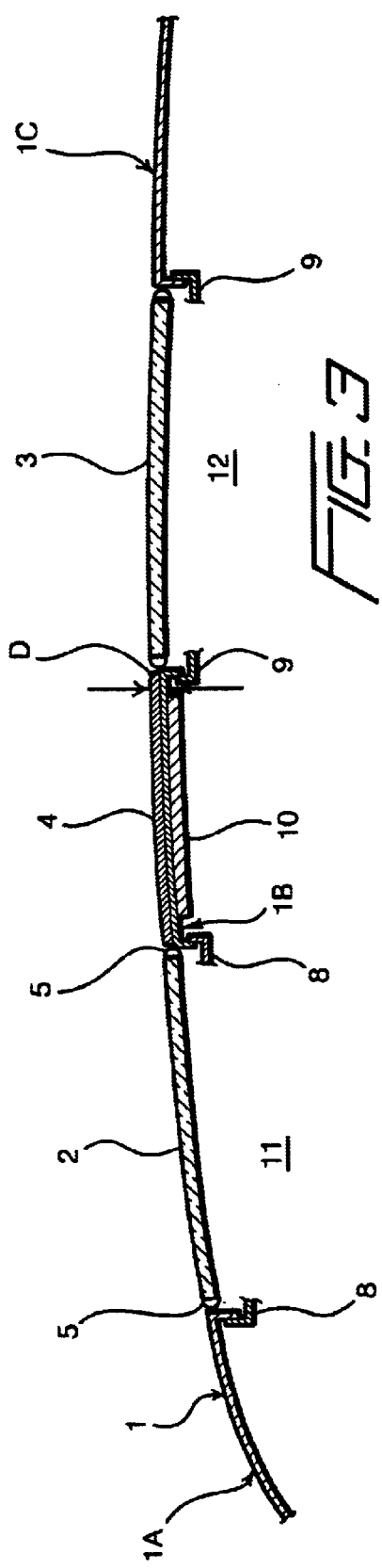
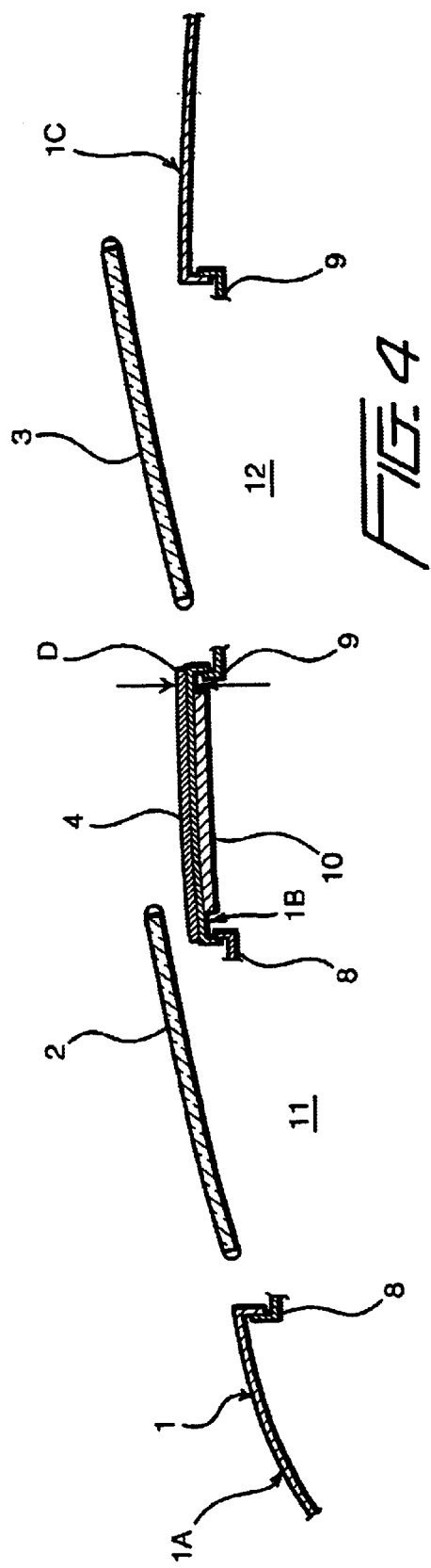

ROOF SYSTEM FOR A MOTOR VEHICLE

BACKGROUND OF THE INVENTION

1. Field of the Invention

The invention relates to a roof system for a motor vehicle with at least two covers which are located in a fixed motor vehicle roof and a section of the fixed motor vehicle roof located between the covers.

2. Description of Related Art

Published German Patent Application DE 41 29 850 A1 discloses a motor vehicle roof with two covers which are spaced apart from one another and between which there is a section of the fixed motor vehicle roof. In this section, additionally, a fixed glass pane is located there. Between the covers and the fixed glass pane, narrow areas of the fixed motor vehicle roof are visible so that the motor vehicle roof makes an visually very fissured impression.

Furthermore, large roof designs are known in which a continuous frame with several successive cover elements is installed in a single large roof opening. These large roof designs are visually very pleasing, but on the other hand, are extremely costly, and therefore, are only suited for original equipment, production line installation in the vehicle shell.

SUMMARY OF THE INVENTION

A primary object of this invention is to devise a roof system which is economical, which is suitable for retrofit installation, and which still leaves a pleasing overall visual impression.

This object is achieved by the provision of a covering on the section between the covers on the fixed motor vehicle roof which is matched in its surface configuration to the surface of the covers.

By inserting a covering which directly borders the adjacent covers and which has a surface which is visually matched to the surface of the covers, two or even more economical, openable motor vehicle roofs can be used which are suitable for retrofit installation and which, in conjunction with the covering, form a visually pleasing roof system.

Since the size of the covering is variable, the roof system can be easily matched to different vehicles using one or more standard sizes of retrofit installed roofs, even if they have different distances of the transverse hoops.

The covers and accordingly also the covering are preferably produced from a transparent material. It is especially advantageous if the covering is formed by a film which can be easily cemented to the section of the fixed motor vehicle roof between the covers.

The thickness of the covering is preferably chosen such that, after installation of the covers, the covering has a flush alignment with their surface. This yields the advantage of reduced wind noise.

If at least one of the covers and/or the covering is provided with solar cells, an economical charging possibility for a motor vehicle battery and/or auxiliary ventilation operation of a fan within the vehicle or one or more fans located in the area of the cover can be implemented. Films provided with solar cells for application to the deck of a boat or to a camper are economically available on the market and thus are suited for use as a covering.

A transverse hoop for stiffening the roof advantageously runs under the section of the fixed motor vehicle roof which lies between the covers. The advantage of the roof system according to the invention is that the given structure of transverse hoops of the motor vehicle is not affected since retrofitted roofs of this size which fit into the intermediate spaces between the transverse hoops can be used. In this way, the stability of the motor vehicle roof is not adversely affected when using the roof system of the invention.

It is especially advantageous if the rear edge of at least one of the covers can be raised above the fixed motor vehicle roof and can be pushed to the rear. By means of the section of the fixed motor vehicle roof which encompasses the covering and which is located between the two covers, the covers are spaced far enough apart from one another that even with independent triggering by means of an electric drive they cannot collide with one another. Thus, there need not be an additional common control device, as in large roof systems, which coordinates the movements of the individual covers.

One embodiment of the invention is described below using the drawings.

BRIEF DESCRIPTION OF THE DRAWINGS

FIGS. 3 & 4 show a lengthwise section through the roof system as shown in FIG. 1 with the covers closed and raised at a rear edge thereof, respectively.

DETAILED DESCRIPTION OF THE INVENTION

Figure 1:
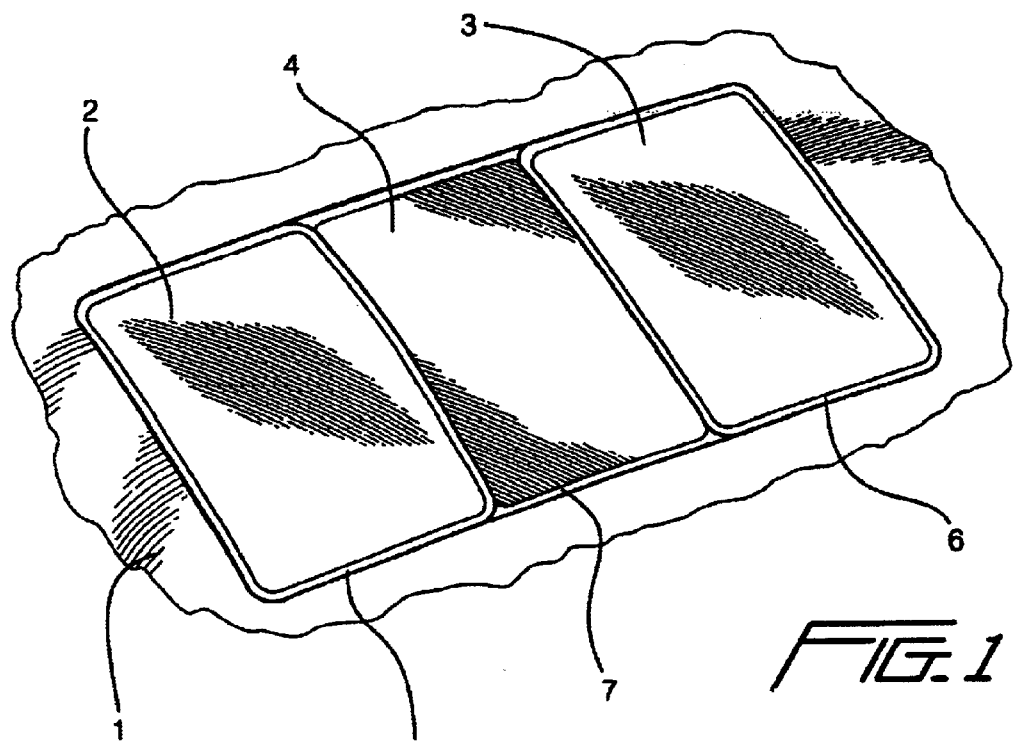
FIG. 1 shows a schematic perspective of a roof system.

The roof system in accordance with the invention is formed by a fixed motor vehicle roof 1 which has a front section 1A, a middle section 1B and a rear section 1C. Between the front section 1A and the middle section 1B, there is a roof opening 11 which can be selectively closed or at least partially opened by means of a cover 2. Between the middle section 1B and the rear section 1C, there is a second roof opening 12 which can be selectively closed or at least partially opened by means of a cover 3.

The cover 2 is supported on a frame 8 which is located on the edge of the roof opening 11 and which is connected to the fixed motor vehicle roof 1. The cover 3 is supported on a frame 9 which is located on the edge of the roof opening 12 and which is connected to the fixed motor vehicle roof 1. Each of the covers can be raised at a rear edge and slid back rearwardly in any know manner, and per se, forms no part of this invention. Without intending to be limiting, suitable means can be found in U.S. Pat. No. 4,911,496, published European Patent Application EP 0 531 881, and German Patents DE 38 01 881 C2 and DE 38 02 380 C2 (all of which are hereby incorporated by reference).

The covers 2, 3 are preferably produced from a transparent material, such as glass. Between the covers 2, 3, there is a covering 4 which is preferably made as a film and which is inserted seamlessly and flush between the covers 2, 3. The thickness D of the covering 4 is chosen such that, after installation of the covers 2, 3, the covering 4 is flush with their surface. The covering 4 is preferably cemented onto the middle section 1B of the fixed motor vehicle roof 1.

The surface of the covering 4 is visually matched to the appearance of the surface of the covers 2, 3. If the covers 2, 3 are made of tinted glass, the covering 4 is formed by a correspondingly tinted film. The appearance of the edge areas 5, 6 of the covers 2, 3 in which, for example, there are seals which surround the covers, are also visually continued in the lateral edge area 7 of the covering 4.

Figure 2:
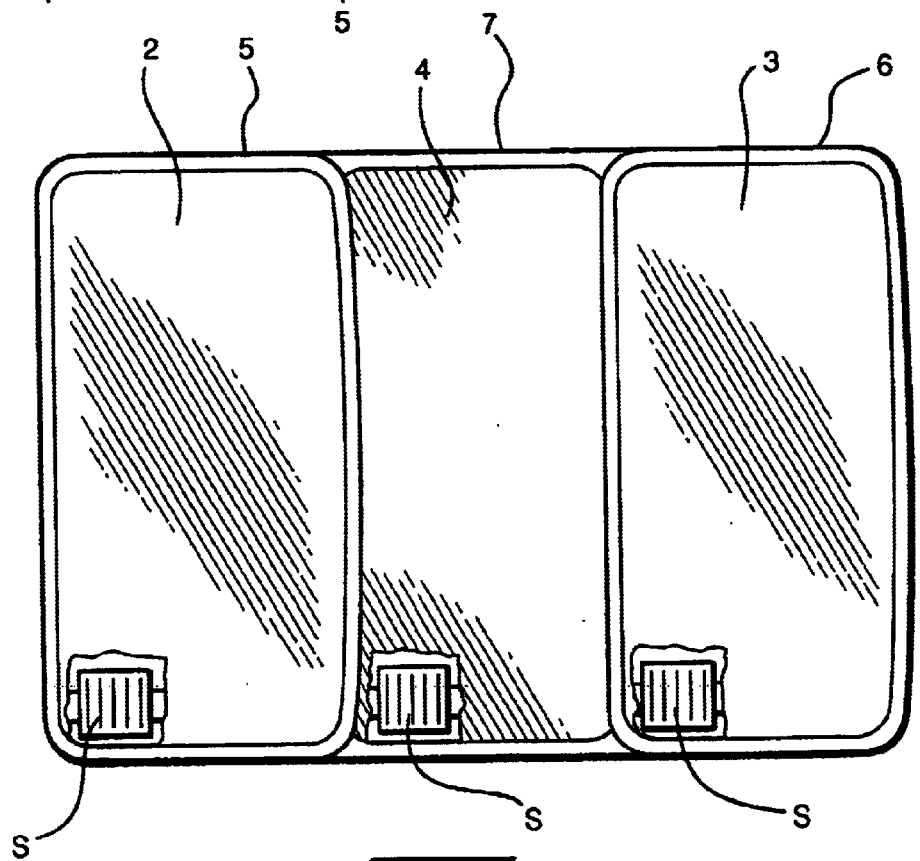
FIG. 2 shows an overhead view of the roof system which is provided with solar cells.

FIG. 2 shows a version in which both the covers 2 and 3 and also the covering 4 are equipped with solar cells S. Since glass covers equipped with solar cells are relatively expensive, a version is also conceivable in which only the covering 4, for example, in the form of a film is equipped with solar cells. These films can be obtained relatively economically for retrofitting purposes onto the decks of boats or campers. The solar cells S with their electrical leads which are not shown can be connected either to a motor vehicle battery and used for its recharging, or alternatively can operate the vehicle fan or a fan located in the area of the covers 2, 3 for auxiliary ventilation. To match the film to the surface of the covers 2, 3, it can be either tinted, varnished or provided with an additional, color-matched film which is located on the bottom or the top of the film which is present as the covering 4.

A transverse brace 10 for stiffening the roof advantageously runs under the section of the fixed motor vehicle roof which lies between the covers 2, 3. The transverse brace 10 provides the advantage that the motor vehicle roof 1 is not affected by formation of the openings 11, 12, when retrofitting a roof of this size since the stability of the motor vehicle roof 1 is not adversely affected when using the roof system of the invention.

What is claimed is:

1. Roof system for a motor vehicle, comprising:

at least two movable covers which are located in a fixed motor vehicle roof, and an intermediate section of the fixed motor vehicle roof located between the covers, wherein a covering is provided on the intermediate section of the fixed motor vehicle roof between the covers, said covering having an outer surface appearance which is matched to an outer surface appearance of the covers; and wherein the covering has a thickness such that, heightwise, an outer surface of the covering is flush with an outer surface of the covers in adjoining areas thereof.

2. Roof system as claimed in claim 1, wherein the covering is a film.

3. Roof system as claimed in claim 2, wherein each of the covers comprise a panel formed of a transparent material.

4. Roof system as claimed in claim 3, wherein the cover panels are formed of glass.

5. Roof system as claimed in claim 3, wherein the covering is formed of a transparent material.

6. Roof system as claimed in claim 1, wherein at least one of the covers and the covering is provided with solar cells.

7. Roof system for a motor vehicle, comprising:

at least two movable covers which are located in a fixed motor vehicle roof, and an intermediate section of the fixed motor vehicle roof located between the covers, wherein a covering is provided on the intermediate section of the fixed motor vehicle roof between the covers, said covering having an outer surface appearance which is matched to an outer surface appearance of the covers; and wherein at least one of the covers with is raisable at a rear edge thereof above the fixed motor vehicle roof and is rearwardly displaceable.

8. Roof system as claimed in claim 1, wherein a transverse brace is provided underneath the intermediate section of the fixed vehicle roof.

9. Roof system as claimed in claim 1, wherein each of the covers comprise a panel formed of a transparent material.

10. Roof system as claimed in claim 9, wherein the cover panels are formed of glass.

11. Roof system as claimed in claim 9, wherein the covering is formed of a transparent material.

12. Roof system for a motor vehicle, comprising:

at least two movable covers which are located in a fixed motor vehicle roof, and an intermediate section of the fixed motor vehicle roof located between the covers, wherein a covering is provided on the intermediate section of the fixed motor vehicle roof between the covers, said covering film having an outer surface appearance which is matched to an outer surface appearance of the covers; and wherein the covering film has a thickness such that, heightwise, an outer surface of the covering is flush with an outer surface of the covers in adjoining areas thereof.

13. Roof system as claimed in claim 12, wherein at least one of the covers and the covering film is provided with solar cells.

14. Roof system as claimed in claim 2, wherein a transverse brace is provided underneath the intermediate section of the fixed vehicle roof.

* * * * *